United States Patent
Zhu et al.

(10) Patent No.: US 10,046,350 B2
(45) Date of Patent: Aug. 14, 2018

(54) SYSTEMS AND METHODS FOR CONTROLLING WATER TEMPERATURE IN TOILETS AND BIDETS

(71) Applicant: Shanghai Kohler Electronics, Ltd., Shanghai (CN)

(72) Inventors: Minghui Zhu, Shanghai (CN); Haixing Sun, Shanghai (CN); Bo Hu, Shanghai (CN)

(73) Assignee: SHANGHAI KOHLER ELECTRONICS, LTD. (CN)

( * ) Notice: Subject to any disclaimer, the term of this patent is extended or adjusted under 35 U.S.C. 154(b) by 0 days.

(21) Appl. No.: 15/341,474

(22) Filed: Nov. 2, 2016

(65) Prior Publication Data
US 2017/0120281 A1    May 4, 2017

(30) Foreign Application Priority Data
Nov. 3, 2015    (CN) .......................... 2015 1 0736975

(51) Int. Cl.
*A47K 3/022*    (2006.01)
*B05B 12/10*    (2006.01)
*E03D 9/08*    (2006.01)

(52) U.S. Cl.
CPC ................ *B05B 12/10* (2013.01); *E03D 9/08* (2013.01)

(58) Field of Classification Search
CPC ........................................................ E03D 9/08
USPC ...................................................... 4/443–448
See application file for complete search history.

(56) References Cited

PUBLICATIONS

Chinese Office Action issued in corresponding application No. 201510736975 dated Mar. 9, 2017 with English translation, 11 pages.
Shangya, Yun, "Method for solving large temperature-overshoot of a drying oven", Dec. 8, 2012 with English translation, 2 pages.*

*Primary Examiner* — Lori Baker
(74) *Attorney, Agent, or Firm* — Foley & Lardner LLP

(57) ABSTRACT

A process includes setting a preset temperature; setting up a counter, wherein a first number is displayed on the counter in response to a water control switch switching from a low position to a high position, a second number is displayed on the counter in response to the water control switching from the high position to the low position; setting a target temperature in response to a first determination as to whether the first number or the second number is displayed on the counter, wherein the target temperature is equal to the preset temperature in response to the first number being displayed and the target temperature is equal to preset temperature less an adjustment temperature in response to the second number being displayed; and maintaining the target temperature for a period of time, then restoring the target temperature to the preset temperature after the period of time.

6 Claims, 4 Drawing Sheets

SYSTEMS AND METHODS FOR CONTROLLING WATER TEMPERATURE IN TOILETS AND BIDETS

CROSS-REFERENCE TO RELATED PATENT APPLICATIONS

The present application claims the benefit of and priority to Chinese Patent Application No. 201510736975.5, filed on Nov. 3, 2015, which is incorporated herein by reference in its entirety including the specification, drawings, claims, and abstract.

BACKGROUND

The present invention relates to the field of smart toilet water temperature control technologies, and in particular to a control method and a control system to prevent temperature overshooting.

A smart toilet has one or more nozzles for washing private parts of humans, and therefore, the control of water temperature is particularly important.

There are fixed feedback algorithms for normal water heating, which can meet the needs when the water output is constant.

During the use, however, it is sometimes necessary to adjust water volume via a water control switch. In the process when the water control switch is switched from a high position to a low position, the water volume could be reduced quickly.

With respect to such a sudden change of water volume, the dependence on an algorithm alone will cause a delay as the heating power needs to be adjusted based on a feedback, and the above delay will cause temperature overshooting. When the water volume drops suddenly, plus the thermal inertia of the heating element itself, in particular, water temperature will become too high, leading to an uncomfortable experience for users.

SUMMARY

One or more embodiments of this application relate to a process (e.g., control method, method, etc.) for controlling a temperature of water sprayed from a nozzle of a toilet or a bidet to prevent overshooting. The process includes setting a preset temperature; setting up a counter, wherein a first number is displayed on the counter in response to a water control switch switching from a low position to a high position, a second number is displayed on the counter in response to the water control switching from the high position to the low position, and the second number is greater than the first number; setting a target temperature in response to a first determination as to whether the first number or the second number is displayed on the counter, wherein the target temperature is equal to the preset temperature in response to the first number being displayed and the target temperature is equal to preset temperature less an adjustment temperature in response to the second number being displayed; and maintaining the target temperature for a period of time, then restoring the target temperature to the preset temperature after the period of time.

Such a process may advantageously overcome the drawbacks of the prior art, for example, by providing a control method and a control system capable of preventing temperature overshooting for devices such as smart toilets and bidets.

By way of non-limiting example, temperature overshooting in toilets and bidets can be prevented by a control method having one or more of the following steps:

S001: setting a preset temperature to be $T_0$;

S002: setting up a counter, wherein the number displayed on the counter is 0 when the water control switch is switched from a low position to a high position; the number displayed on the counter is greater than 0 when the water control switch is switched from a high position to a low position;

S003: determining the number displayed on the counter;

S004: setting a target temperature according to the determination result from the step S003, if the number displayed on the counter is 0, setting the target temperature to be $T=T_0$; if the number displayed on the counter is greater than 0, setting the target temperature to be $T_1$ degrees lower than said preset temperature, the target temperature being $T=T_0-T_1$;

S005: maintaining the target temperature $T=T_0-T_1$ for a period of time t, then restoring to the preset temperature $T_0$.

For example, said $T_1$ may be equal to 2°.

Also for example, there may be a direct proportional relationship between said $T_1$ and a number of downshift positions Dn, where $T_1=K \times Dn$, where Dn is the number of switch positions, and K is a proportion factor.

Also for example, period of time t may be equal to 750 ms.

Also for example, the step S002 may, optionally, include one or more of the following steps:

Setting, when the water control switch is switched by one position, the number of the counter to be A, and setting the delay of said water control switch in the switching process to be B;

When the water control switch is switched from a high position to a low position, determining if the water control switch carries out an operation of downshift first and then upshift or an operation of downshift only;

If an operation of downshift only is carried out, then $t=(m1)*A-B$, wherein m1 is the number of switched positions, and m1 is a natural number greater than or equal to 1;

If an operation of downshift first and then upshift is carried out, determining if the number displayed on the counter is greater than A;

If the number displayed on the counter is smaller than A, resetting the counter;

If the number displayed on the counter is greater than A, then $t=(m2)*A-B$, wherein m2 is the number of switched positions, and m2 is a natural number greater than or equal to 2.

For example, the counter may be a time counter or a position counter.

One or more embodiments of the application relate to a control system for a toilet or a bidet to prevent temperature overshooting of water sprayed from a nozzle of the toilet or the bidet. The control system includes a water control switch switchable between a low position and a high position; a preset temperature module that sets a preset temperature; a counter module that calculates and displays a number, wherein the number displayed is zero in the high position of the water control switch and the number displayed is greater than zero in the low position of the water control switch; a target temperature control module that sets a target temperature in response to the number displayed on the counter module, wherein the target temperature is equal to the preset temperature in response to zero being displayed on the counter module, and the target temperature is equal to the preset temperature less an adjustment temperature in response to a number greater than zero being displayed on the counter module, with the adjustment temperature being greater than zero; and a target temperature maintaining module that maintains the target temperature for a period of time and restores the target temperature to the preset temperature after the period of time.

By way of non-limiting example, such temperature overshooting can be prevented by a control system that includes one or more of the following:

A preset temperature module configured to set a preset temperature to be $T_0$;

A counter module configured to calculate and display a number, the number displayed on the counter module is 0 when the water control switch is switched from a low position to a high position; the number displayed on the counter module is greater than 0 when the water control switch is switched from a high position to a low position;

A number determination module configured to determine if the number displayed on the counter module is greater than 0;

A target temperature control module configured to set a target temperature according to a determination result from the number determination module, if the number displayed on the counter module is 0, set the target temperature to be $T=T_0$; if the number displayed on the counter module is greater than 0, set the target temperature to be $T_1$ degrees lower than said preset temperature, the target temperature being $T=T_0-T_1$;

A target temperature maintaining module configured to maintain the target temperature $T=T_0-T_1$ for a period of time t, then restoring to the preset temperature $T_0$.

For example, said $T_1$ may be equal to 2°.

Also for example, there may be a direct proportional relationship between said $T_1$ and a number of downshift positions Dn, where $T_1=K \times Dn$, where Dn is the number of switch positions, and K is a proportion factor.

Also for example, the period of time t may be equal to 750 ms.

Also for example, the counter module may, optionally, include one or more of the following (elements, modules, etc.):

A number setting module configured to set, when the water control switch is switched by one position, the number of the counter module to be A, and set the delay of said water control switch in the switching process to be B;

A position switch determination module configured to determine, when the water control switch is switched from a high position to a low position, if the water control switch carries out an operation of downshift first and then upshift or an operation of downshift only;

A downshift only maintaining time t calculating module configured to calculate a maintaining time t according to the number displayed on the counter module; if an operation of downshift only is carried out, then $t=(m1)*A-B$, wherein m1 is the number of switched positions, and m1 is a natural number greater than or equal to 1;

A number comparison and determination module configured to read the number displayed on the counter module in an operation of downshift first and then upshift, and determine if the number displayed on the counter is greater than A;

A counter reset module configured to determine if resetting is to be carried out according to a result from the number comparison and determination module, and if the number displayed on the counter module is smaller than A, reset the counter;

A module to calculate a maintaining time t for downshift first and then upshift, configured to calculate a maintaining time t according to the number displayed on the counter module; if an operation of downshift first and then upshift is carried out, and if the number displayed on the counter module is greater than A, then $t=(m2-1)*A-B$, wherein m2 is the number of switched positions, and m2 is a natural number greater than or equal to 2.

For example, the counter module may be a time counter module or a position counter module.

One or more embodiments in this application relate to toilets or bidets configured to receive a supply of water. The toilets or bidets include a nozzle for spraying the water; a water control switch operable in a low position and a high position; a preset temperature module that sets a preset temperature; a counter module that calculates and displays a number, wherein the number is zero in the high position, and the number is greater than zero in the low position; a control module that sets a target temperature in response to the number, wherein the target temperature is equal to the preset temperature in response to the number being zero, and the target temperature is equal to the preset temperature less an adjustment temperature in response to the number being greater than zero, wherein the adjustment temperature is greater than zero; and a maintenance module that maintains the target temperature for a period of time.

The embodiments of this application may achieve several advantageous effects. For example, With control operations by the above control method or control system, when a user shifts up a position, the water temperature remains unchanged, and when the user shifts down a position, the water temperature can be adjusted down to a target temperature for a period of time and then restored to a preset temperature. It ensures that, during position switch, the phenomenon of temperature overshooting is avoided to maintain the temperature stability and result in a comfortable experience to users.

DETAILED DESCRIPTION

With general reference to the FIGURES, disclosed in this application are control systems and control methods for use with toilets, bidets, and other similar devices that spray or direct water to a user in order to prevent temperature overshooting of water sprayed from a nozzle of the toilet, the bidet, and other device. By way of non-limiting example, the controls systems and control methods may be used with smart toilets and smart bidets that include electronic controllers for monitoring and/or controlling the temperature of the water sprayed. Specific embodiments of the present application will be further described below with reference to the accompanying drawings.

Figure 1:
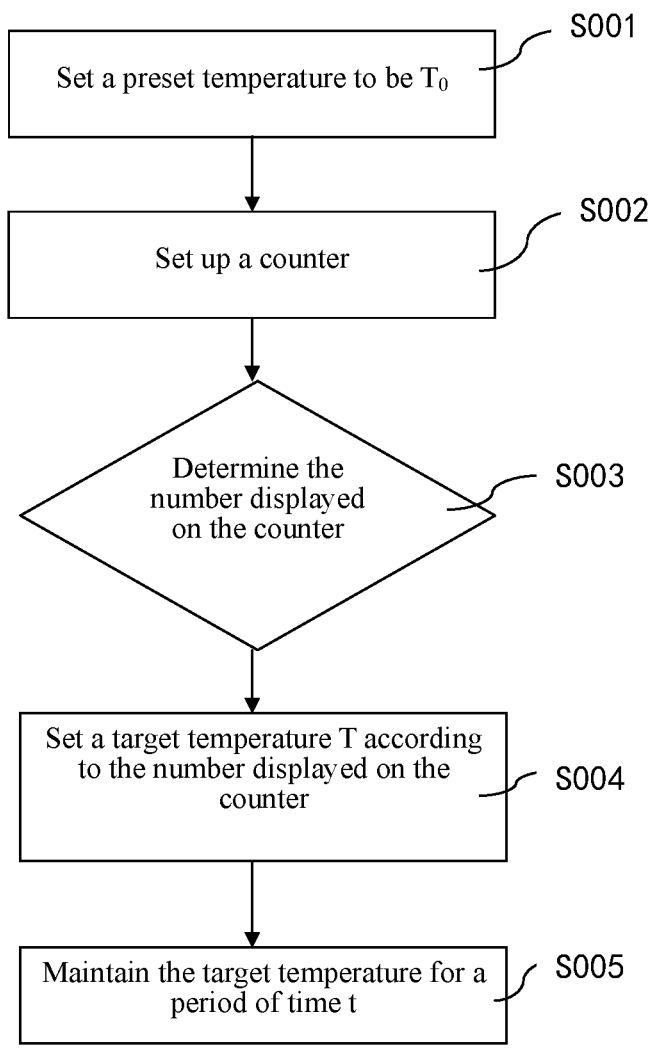
FIG. 1 is a flow chart of a control method to prevent temperature overshooting according to the present invention.

FIG. 1 illustrates a control method (e.g., process, etc.) to prevent temperature overshooting, according to an exemplary embodiment, that includes a first step S001, a second step S002, a third step S003, a fourth step S004, and a fifth step S005. Although the steps may be described below using sequential terms (e.g., first, second, third, etc.), the order of the steps can be rearranged (e.g., reconfigured, switched, etc.). Additionally, one or more of the five steps may be omitted and/or combined with another step.

The first step S001 involves setting a preset temperature to be, for example, $T_0$.

The second step S002 involves setting up a counter, where a number is displayed on the counter in response to a switching of a water control switch. For example, a first number may be displayed on the counter in response to the water control switch switching from a low position to a high position. Also for example, a second number may be displayed on the counter in response to the water control switch switching from the low position to the high position. According to one or more embodiments, the first number displayed on the counter is equal to zero (0) when the water control switch is switched from a low position to a high position, and the second number displayed on the counter is greater than zero (0) when the water control switch is switched from a high position to a low position.

The third step S003 involves determining the number displayed on the counter.

The fourth step S004 involves setting a target temperature in response to a first determination as to whether the first number or the second number is displayed on the counter. The target temperature may be set equal to the preset temperature in response to the first number being displayed, and the target temperature may be set equal to preset temperature less an adjustment temperature in response to the second number being displayed. According to one or more embodiments, the target temperature is set according to the number displayed on the counter, such that if the number displayed on the counter is equal to zero (0), then the target temperature T set is equal to the preset temperature (e.g., $T=T_0$); and if the number displayed on the counter is greater than zero (0), then the target temperature is set $T_1$ degrees lower than the preset temperature $T_0$. That is, the target temperature T set is equal to the preset temperature less (e.g., minus, etc.) an adjustment temperature $T_1$ (e.g., $T=T_0-T_1$), wherein $T_1$ is smaller than $T_0$.

The fifth step S005 involves maintaining the target temperature T (e.g., $T=T_0-T_1$) for a period of time t, then restoring the target temperature T to the preset temperature $T_0$.

As noted, the disclosed control method may prevent temperature overshooting in devices such as smart toilets to prevent temperature overshooting in the water sprayed out from a nozzle (e.g., onto a user of the smart toilet) when a water control switch is switched. For example, the toilet or bidet may include a sprayer having one or more nozzles through which water is sprayed.

The toilet or bidet may also include a water control switch for controlling when water is sprayed from one or more nozzles, such as upon activated from a non-use position to one or more use positions. According to one more embodiments, when the water control switch is switched to a low position, the target temperature can be manually lowered within a preset time as it is sure that the water volume decreases, such that the impact of thermal inertia is offset, and the water temperature is restored to a set target temperature $T_0$ after the preset time. The basic concept thereof is that it is sure that a convex water temperature wave is produced due to the decreased water volume, so it can be offset if a concave water temperature wave is manually produced such that the water temperature is maintained stable during sudden changes of flow rate.

According to one more embodiments, the water control switch is a single-cycle control switch, which can be switched only in a single cycle. For example, the water control switch can be switched sequentially from Position 5 to Position 4, Position 3, Position 2, and Position 1, or sequentially from Position 1 to Position 2, Position 3, Position 4, and Position 5, and the like. After switched sequentially from a high position to a low position, the water control switch may be further switched sequentially to a high position. For example, the water control switch is switched sequentially from Position 5 to Position 4, Position 3, Position 2, and Position 1, and then sequentially from Position 1 to Position 2, Position 3, and the like.

According to one more embodiments, the water control switch cannot be switched from a position to be switched away to a position that is not adjacent. For example, such a water control switch would not switch directly from Position 3 to Position 1 or Position 5.

A preset temperature $T_0$ may be set (e.g., set first) in the control system/method, such that the temperature demand during normal water spraying of the device (e.g., toilet, bidet, etc.) is met. For example, the preset temperature $T_0$ may be set in response to an input by a user of the device.

A counter may be set up (e.g., programmed) in the control system/method, for example, such that the number displayed on the counter is zero (0) when the water control switch is switched from a low position to a high position; and the number displayed on the counter is greater than zero (0) when the water control switch is switched from a high position to a low position, to facilitate a subsequent determination operation.

Subsequently, the number displayed on the counter may be determined and a target temperature may be set according to the number displayed on the counter. For example, if the number displayed on the counter is zero (0), the target temperature may T be set to be $T=T_0$; whereas if the number displayed on the counter is greater than zero (0), the target temperature T may be set to be $T_1$ degrees lower than said preset temperature, with the target temperature T being $T=T_0-T_1$, where $T_1$, which may be considered an adjustment temperature, is smaller than $T_0$. The control system/method may be configured (e.g., programmed) to maintain the target temperature $T=T_0-T_1$ for a period of time t, then restoring to the preset temperature $T_0$ (e.g., after the period of time t).

The control system/method may be controlled/programmed such that when a user shifts up a position, the water temperature remains unchanged, and when the user shifts down a position, the water temperature can be adjusted down to a target temperature for a period of time and then restored to a preset temperature. This system/method ensures that, during position switch, the phenomenon of temperature overshooting is avoided to maintain the temperature stability and result in a comfortable experience for the user(s) of the device.

For one or more embodiments, the adjustment temperature $T_1$ is equal to two degrees (i.e., $T_1=2°$). According to characteristics of one or more smart toilets, a decrease by 2° can prevent temperature overshooting, and moreover, can prevent the temperature from decreasing too much that results in an overly low water temperature. It is noted that $T_1$ may also be set to other constants as needed.

For one or more embodiments, there may be a direct proportional relationship between the adjustment temperature $T_1$ and a number of downshift positions Dn. One example of such a proportional relationship is when $T_1=K\times Dn$, where Dn is the number of switch positions, and K is a proportion factor. The value of the proportion factor K may be set as needed. The adjustment temperature $T_1$ (e.g., decreased temperature) may also be set to be a variable (e.g., value, etc.) corresponding to a position as needed. A downshift to a different position will have a corresponding temperature so as to better satisfy different needs.

For one or more embodiments, the period of time t is equal to 750 ms (i.e., t=750 ms). Since it typically does not require a large volume of water from a smart toilet (e.g., relative to the volume of water contained within the toilet) to wash a person's private part, a target temperature T (e.g., $T=T_0-T_1$ or $T=T_0-2$) may be set (e.g., for most all toilets) to be maintained for 750 ms no matter whether a span of position switch is 2, 3, 4 or the like, which can prevent the temperature overshooting. It is noted that the period of time t may also be set to other constants as needed.

Figure 2:
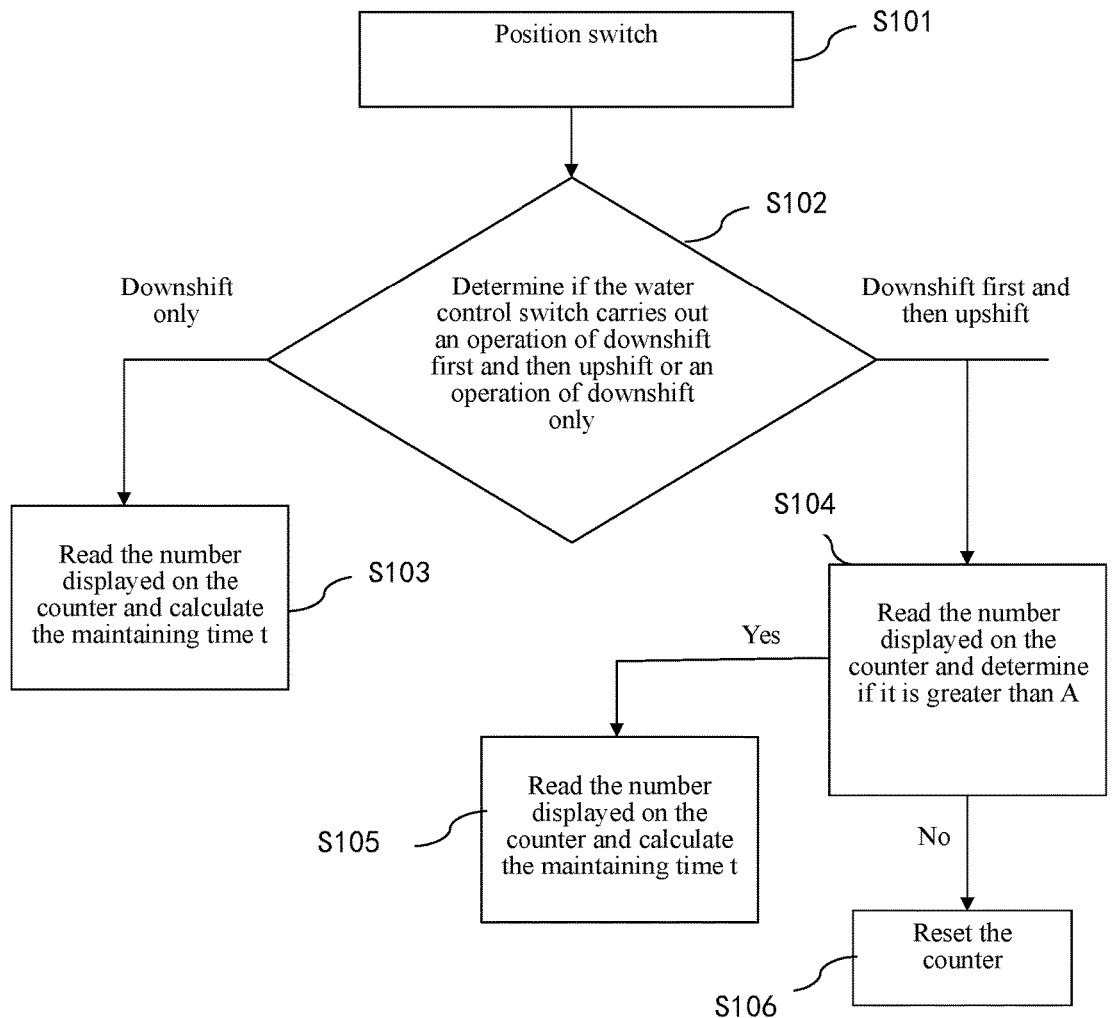
FIG. 2 is a flow chart of a calculation method for the counter.

As shown in FIG. 2, the second step S002 may include additional steps (e.g., sub-steps), according to one or more embodiments. As shown, the second step S002 includes a first sub-step S101, a second sub-step S102, a third sub-step S103, a fourth sub-step S104, a fifth sub-step S105, and a sixth sub-step S106. Although the steps may be described below using sequential terms (e.g., first, second, third, etc.), the order of the steps can be rearranged (e.g., reconfigured, switched, etc.). Additionally, one or more of the sub-steps may be omitted and/or combined with another step and/or sub-step.

The first sub-step S101 involves the switch position. For example, when the water control switch is switched by one position, the number of the counter may be set to a number/value/variable A (e.g., third number, first value, etc.), and the delay of said water control switch in the switching process may be set to a number/value/variable B (e.g., fourth number, second value, etc.). This may take place in a module of the system, such as, for example, within a number setting module.

The second sub-step S102 involves determining, such as in a position switch determination module, if the water control switch carries out an operation of downshift first and then upshift or an operation of downshift only when the water control switch is switched from a high position to a low position. For example, in response to the water control switching from the high position to the low position, a determination may be made as to whether the water control switch carries out an operation of a downshift and then an upshift or an operation of a downshift only.

The third sub-step S103 involves the water control switch carrying out the operation of the downshift only. According to one or more embodiments, in response to the determination that the operation of the downshift only is carried out, the period of time is equal to a first modifier multiplied by the third number less the fourth number, and the first modifier is the number of switched position and is a natural number greater than or equal to one. For example, if an operation of downshift only is carried out, then the period of time is a maintaining time t=(m1)*A−B, wherein m1 is the number of switched positions, and m1 is a natural number greater than or equal to 1.

The fourth sub-step S104 involves the water control switch carrying out the operation of the downshift first and then the upshift. According to one or more embodiments, in response to the determination that the operation of the downshift then the upshift is carried out, another determination is made as to whether the number displayed on the counter is greater than the third number. For example, if an operation of downshift first and then upshift is carried out, determining if the number displayed on the counter is greater than A. As shown in FIG. 2, if the number displayed on the counter is smaller than A, then the counter is reset in the sixth sub-step S106. Also shown, if the number displayed on the counter is greater than A, then the number is read and the maintaining time t is calculated in the fifth sub-step S105. According to one or more embodiments, if the number displayed on the counter is greater than A, then t=(m2−1)*A−B, wherein m2 is the number of switched positions, and m2 is a natural number greater than or equal to 2.

Since the downshift of positions of a smart toilet is a position by position switch from a high position to a low position, and the upshift of positions is also a position by position switch from a low position to a high position, a user may have delays during switch. As a result, when the water control switch is switched by one position, the number of the counter may be set to A, such as, for example, when A=750 ms. Also for example, the delay of said water control switch in the switching process may be set to B.

During position switch, the control system/method may determine if the water control switch carries out an operation of downshift first and then upshift or an operation of downshift only. As used in this application, the operation of downshift only denotes an operation in which the water control switch is only switched sequentially from a high position to a low position. One such non-limiting example is when the water control switch is switched sequentially from Position 3 to Position 2 and Position 1, and the like. As used in this application, the operation of downshift first and then upshift according to the present invention denotes an operation in which the water control switch is switched sequentially from a high position to a low position, and then switched to a high position. One such non-limiting example is when the water control switch is switched sequentially from Position 3 to Position 2 and Position 1, and then switched to Position 2, and the like.

According to one or more embodiments, if it is determined that the water control switch carries out an operation of downshift only, reading the number displayed on the counter, the display number may be (m1)*A−B, and the system determines, according to said display number, the maintaining time to be t=(m1)*A−B. For example, when the water control switch is switched sequentially from Position 3 to Position 1, m1=2, the number displayed on the counter is 2*A−B, then according to the step S004, setting the target temperature to be $T=T_0-T_1$, and maintaining the target temperature for t=2*A−B, then restoring to the preset temperature $T_0$.

If it is determined that the water control switch carries out an operation of downshift first and then upshift, the control system/method may determine whether the number displayed on the counter is greater than A.

If the number displayed on the counter is smaller than A, the control system/method may reset the counter. For example, when the water control switch is switched sequentially from Position 3 to Position 2, Position 1, Position 2, Position 3 and all the way to Position 4, the number displayed on the counter is smaller than A, resetting the counter, then according to the step S004, setting the target temperature to be $T=T_0$.

If the number displayed on the counter is greater than A, reading the number displayed on the counter, the display number is (m2−1)*A−B, and the system/method determines, according to said display number, the maintaining time to be t=(m2−1)*A−B. For example, when the water control switch is switched sequentially from Position 3 to Position 2, Position 1 and then to Position 2, m2=3, the number displayed on the counter is 2*A−B, then according to the step S004, setting the target temperature to be $T=T_0-T_1$, and maintaining the target temperature for t=2*A−B, then restoring to the preset temperature $T_0$.

In such a system/method, it is ensured that the water temperature remains constant even when a user causes delay in switching, which prevents temperature overshooting. According to one or more embodiments, said counter is a time counter or a position counter. Different counters may be set up as needed, so as to meet different needs.

Figure 3:
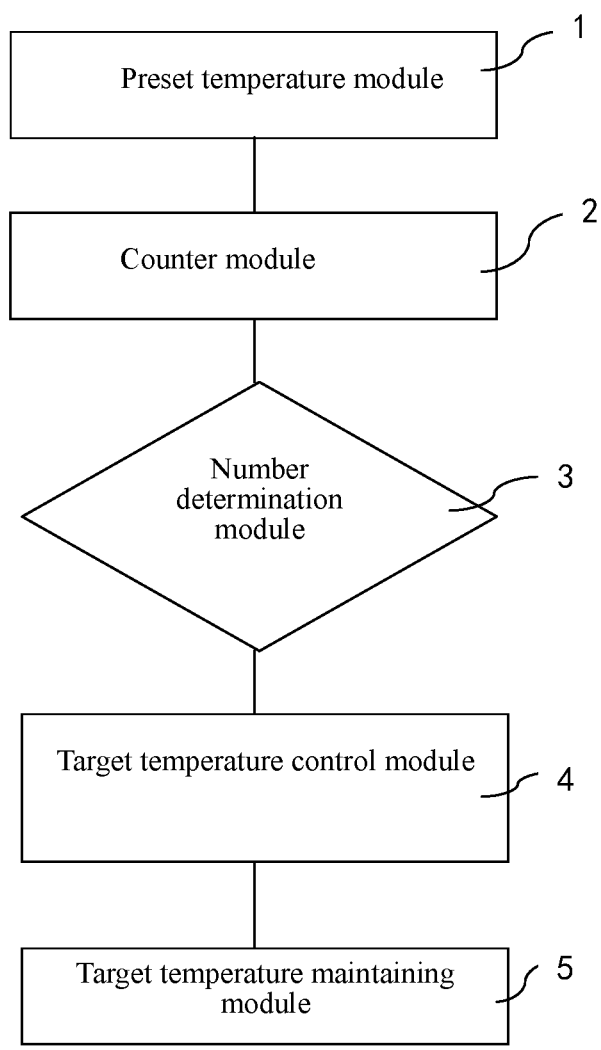
FIG. 3 is a schematic diagram of modules of a control system to prevent temperature overshooting according to the present invention.

FIG. 3 illustrates a schematic of a control system/method to prevent temperature overshooting, according to one or more embodiments of the present application. The system/method includes one or more modules. As shown, the control system includes a preset temperature module 1, a counter module 2, a number determination module 3, a target temperature control module 4, and a target temperature maintaining module 5.

The preset temperature module 1 is configured to set a preset temperature $T_0$. The preset temperature $T_0$ may be based on an input from a user, such as through a user interface.

The counter module 2 is configured to calculate and display a number. For example, the number displayed on the counter module may be zero (0) when the water control switch is switched from a low position to a high position; and/or the number displayed on the counter module is greater than zero (0) when the water control switch is switched from a high position to a low position.

The number determination module 3 us configured to determine if the number displayed on the counter module 2 is greater than zero (0).

The target temperature control module 4 is configured to set a target temperature, according to a determination result from the number determination module 3. For example, if the number displayed on the counter module 2 is zero (0), then the target temperature control module 4 may set the target temperature to be $T=T_0$; and/or if the number displayed on the counter module 2 is greater than zero (0), then the target temperature control module 4 may set the target temperature $T$ to be $T_1$ degrees lower than said preset temperature $T_0$, such that the target temperature $T=T_0-T_1$.

The target temperature maintaining module 5 is configured to maintain the target temperature $T=T_0-T_1$ for a period of time t, then restoring the target temperature $T$ to be the preset temperature $T_0$.

As noted, the control systems/methods to prevent temperature overshooting may be particularly advantageous when employed on smart toilets, bidets, or similar devices to prevent temperature overshooting in the water sprayed out from a nozzle when a water control switch is switched.

When a water control switch is switched to a low position, the target temperature can be manually lowered within a preset time as it is sure that the water volume decreases, such that the impact of thermal inertia is offset, and the water temperature is restored to a set target temperature $T_0$ after the preset time. The basic concept thereof is that it is sure that a convex water temperature wave is produced due to the decreased water volume, so it can be offset if a concave water temperature wave is manually produced such that the water temperature is maintained stable during sudden changes of flow rate.

The control systems/toilets may first set a preset temperature to be $T_0$ via the preset temperature module 1, such that the temperature demand during normal water spraying is met.

The control systems/toilets may set up a counter via the counter module 2, such that the number displayed on the counter module 2 is zero (0) when the water control switch is switched from a low position to a high position; and/or the number displayed on the counter module 2 is greater than zero (0) when the water control switch is switched from a high position to a low position.

The control systems/toilets may determine (e.g., subsequently) the number displayed on the counter module 2 via the number determination module 3. The target temperature control module 4 may set a target temperature, such as according to the determination result of the number determination module 3. For example, if the number displayed on the counter module 2 is zero (0), the target temperature may be set to be $T=T_0$; and/or if the number displayed on the counter module 2 is greater than zero (0), the target temperature may be set to be $T_1$ degrees lower than said preset temperature, such that the target temperature $T=T_0-T_1$, wherein $T_1$ is smaller than $T_0$; and maintaining the target temperature $T=T_0-T_1$ for a period of time t via the target temperature maintaining module 5, then restoring to the preset temperature $T_0$.

In such a way, when a user shifts up a position, the water temperature remains unchanged, and when the user shifts down a position, the water temperature can be adjusted down to a target temperature for a period of time and then restored to a preset temperature. It ensures that, during position switch, the phenomenon of temperature overshooting is avoided to maintain the temperature stability and result in a comfortable experience to users.

As a non-limiting example, the adjustment temperature $T_1$ may be two degrees (i.e., $T_1=2°$). According to characteristics of a smart toilet, a decrease in temperature of water by 2° can prevent temperature overshooting, and moreover, can prevent the temperature from decreasing too much that results in an overly low water temperature. It is noted that $T_1$ may also be set to other constants as needed.

The control systems/methods may be configured having a direct proportional relationship between $T_1$ and a number of downshift positions Dn, said $T_1=K \times Dn$, wherein Dn is the number of switch positions, and K is a proportion factor. The value of K may be set as needed. The decreased temperature $T_1$ may also be set to be a variable corresponding to a position as needed, a downshift to a different position will have a corresponding temperature so as to better satisfy different needs.

According to one or more embodiments, t=750 ms. Since it does not require a large volume of water from a smart toilet to wash a person's private part(s), a target temperature ($T=T_0-T_1$ or $T=T_0-2$) is always set to be maintained for 750 ms no matter whether a span of the position switch (e.g., the movement of the position switch) is 2, 3, 4 or the like, which can prevent the temperature overshooting. Naturally, t may also be set to other constants as needed.

Figure 4:
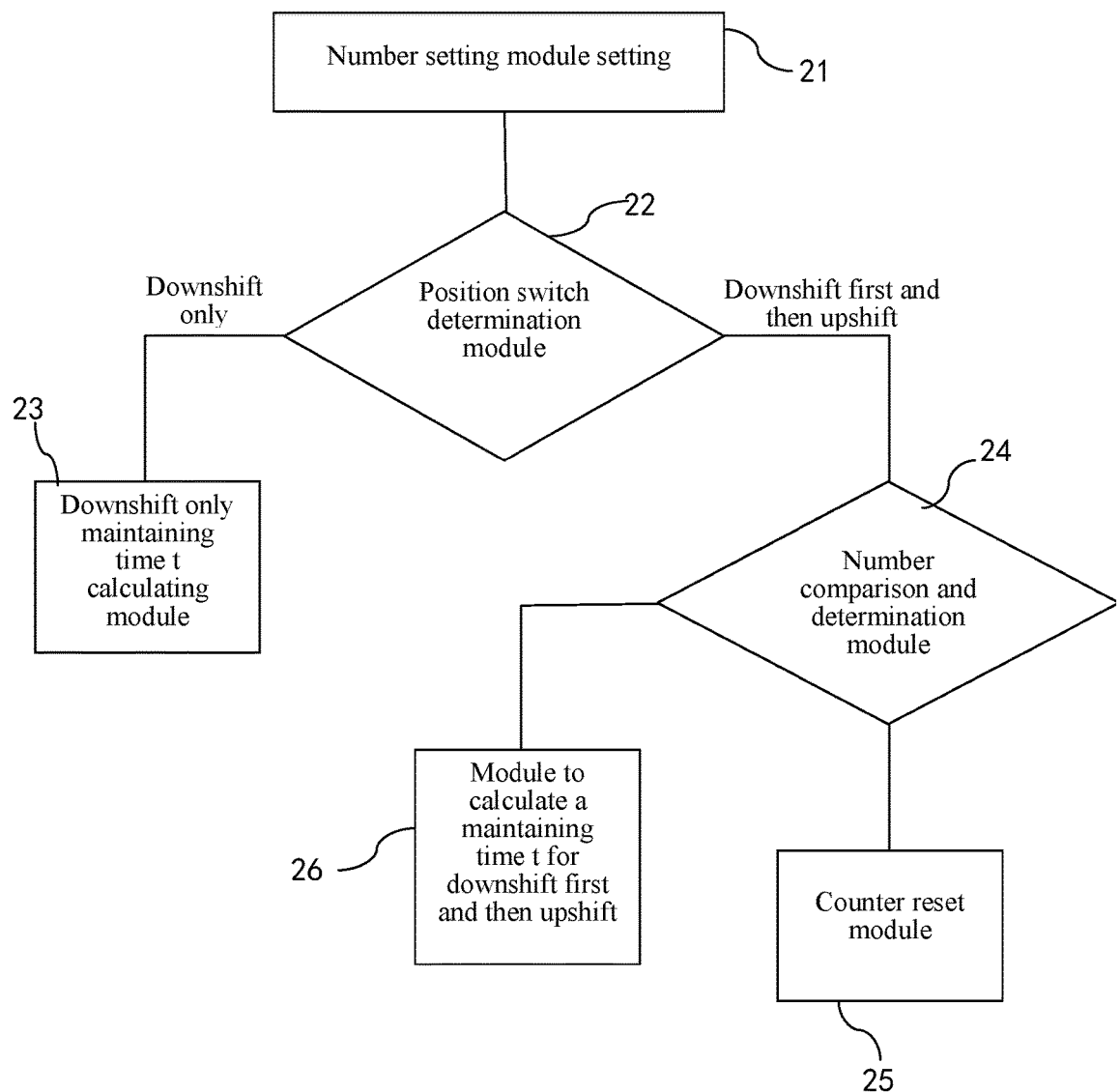
FIG. 4 is a schematic diagram of the counter module.

The counter module 2 may include one or more additional modules. As shown in FIG. 4, the counter module 2 may also include a number setting module 21, a position switch determination module 22, a calculating module 23, a number comparison and determination module 24, and/or a counter reset module 25.

The number setting module 21 may set the number of the counter to a first value and/or may set a delay of the water control switch in the switching process to a second value in response to the water control switch being switched by one position. For example, the number setting module 21 may be configured to set, when the water control switch is switched by one position, the number of the counter module to be a number/value, such as A, and/or set the delay of said water control switch in the switching process to be a number/value, such as B.

The position switch determination module 22 may determine whether the water control switch carries out an operation of a downshift and then an upshift, or carries out an operation of a downshift only, in response to the water control switching from a high position to a low position.

For example, the position switch determination module 22 may be configured to determine, when the water control switch is switched from a high position to a low position, if the water control switch carries out an operation of downshift first and then upshift or an operation of downshift only.

The downshift only maintaining time t calculating module 23 (e.g., a first calculating module) may be configured to calculate the period of time, in response to the operation of the downshift only, to be equal to a first modifier multiplied by the first value less the second value, wherein the first modifier is the number of switched positions and is a natural number greater than or equal to one. For example, the downshift only maintaining time t calculating module 23 may be configured to calculate a maintaining time t according to the number displayed on the counter module 2; if an operation of downshift only is carried out, then t=(m1)*A−B, wherein m1 is the number of switched positions, and m1 is a natural number greater than or equal to 1.

The number comparison and determination module 24 may be configured to read the number displayed on the counter module in the operation of the downshift and then the upshift, and/or determine whether the number displayed on the counter is greater than the first value. For example, the number comparison and determination module 24 is configured to read the number displayed on the counter module in an operation of downshift first and then upshift, and determine if the number displayed on the counter is greater than A.

The counter reset module 25 may be configured to determine whether to reset in response to a result by the number comparison and determination module. The counter may be reset by the counter reset module in response to the number displayed on the counter module being less than the first value. For example, the counter reset module 25 may be configured to determine if resetting is to be carried out according to a result from the number comparison and determination module 24, and if the number displayed on the counter module is smaller than A, reset the counter 2.

Another module 26 (e.g., a second calculating module) may be provided, as shown in FIG. 4. The module 26 may be configured to calculate a period of time, in response to the operation of the downshift first and then the upshift, to be equal to a third value multiplied by the first value less the second value. The third value may be equal to a second modifier less one. The second modifier may be the number of switched positions and is a natural number greater than or equal to two. The module 26 may be configured to calculate a maintaining time t for downshift first and then upshift. For example, the module 26 may be configured to calculate a maintaining time t according to the number displayed on the counter module 2; if an operation of downshift first and then upshift is carried out, and if the number displayed on the counter module is greater than A, then t=(m2−1)*A−B, such as where m2 is the number of switched positions, and m2 is a natural number greater than or equal to 2.

Since the downshift of positions of a smart toilet is a position by position switch from a high position to a low position, and the upshift of positions is also a position by position switch from a low position to a high position, a user may have delays during switch.

As a result, the number setting module 21 sets the number of the counter to be A when the water control switch is switched by one position. According to one or more example, A=750 ms. The number setting module 21 may set the delay of said water control switch in the switching process to be B.

During position switch, the system/method determines whether the water control switch carries out an operation of downshift first and then upshift or an operation of downshift only via the position switch determination module 22.

If it is determined that the water control switch carries out an operation of a downshift only, then the system/method may read the number displayed on the counter. The display number may be (m1)*A−B, and if it is determined, according to said display number, the maintaining time may be t=(m1)*A−B via the downshift only maintaining time t calculating module 23.

For example, if the water control switch is switched sequentially from Position 3 to Position 1, then m1=2 and the number displayed on the counter is 2*A−B. Then, according to the step S004, the system/method sets the target temperature to be $T=T_0-T_1$, and maintains the target temperature for t=2*A−B, then restoring to the preset temperature $T_0$.

If the system/method determines that the water control switch carries out an operation of downshift first and then upshift, then the system/method may determine if the number displayed on the counter is greater than A via the number comparison and determination module 24.

If the system/method determines that the number displayed on the counter module is smaller than A, the counter reset module 25 resets the counter. For example, when the water control switch is switched sequentially from Position 3 to Position 2, Position 1, Position 2, Position 3 and all the way to Position 4, the number displayed on the counter module is smaller than A, the counter reset module 25 of the system resets the counter, then according to the step S004, the system sets the target temperature to be $T=T_0$.

If the system/method determines that the number displayed on the counter is greater than A, the number displayed on the counter is read, and the number displayed is (m2×1)*A−B. The module 26 calculates a maintaining time t for downshift first and then upshift determines, according to said display number, and the maintaining time is t=(m2−1)*A−B.

For example, when the water control switch is switched sequentially from Position 3 to Position 2, Position 1 and then to Position 2, m2=3, and the number displayed on the counter is 2*A−B. Then, according to the step S004, the system/method sets the target temperature to be $T=T_0-T_1$, and maintains the target temperature for t=2*A−B, then restores to the preset temperature $T_0$.

In such a way, it is ensured that the water temperature remains constant even when a user causes delay in switching, which prevents temperature overshooting.

According to one or more examples, the counter module 2 is a time counter module or a position counter module. Different counters may be set up as needed, so as to meet different needs.

The control methods and/or control systems disclosed herein are configured to prevent temperature overshooting when, for example, a user shifts up a position, the water temperature remains unchanged, and when the user shifts down a position, the water temperature can be adjusted down to a target temperature for a period of time and then restored to a preset temperature. Such systems/methods ensure that, during position switch, the phenomenon of temperature overshooting is avoided to maintain the temperature stability and result in a comfortable experience to users. The above systems/methods may be combined as needed to achieve optimal technical effects.

The above description is intended to be explanatory and, therefore, is non-limiting in nature. It should be noted that other variations may be made by those skilled in the art based on the principle of the disclosure of this application, which shall also be encompassed by the scope of the present invention as recited in the claims.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the control systems/methods for toilets, bidets and the like, as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element (e.g., module, switch, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A process for controlling a temperature of water sprayed from a nozzle of a toilet or a bidet to prevent overshooting, comprising:
    setting a preset temperature;
    setting up a counter, wherein a first number is displayed on the counter in response to a water control switch switching from a low position to a high position, a second number is displayed on the counter in response to the water control switching from the high position to the low position, and the second number is greater than the first number;
    setting a target temperature in response to a first determination as to whether the first number or the second number is displayed on the counter, wherein the target temperature is equal to the preset temperature in response to the first number being displayed and the target temperature is equal to preset temperature less an adjustment temperature in response to the second number being displayed; and
    maintaining the target temperature for a period of time, then restoring the target temperature to the preset temperature after the period of time.

2. The process of claim 1, wherein the adjustment temperature is 2 degrees.

3. The process of claim 1, wherein the adjustment temperature is equal to a proportion factor multiplied by a number of downshift positions of the water control switch.

4. The process of claim 1, wherein the period of time is equal to 750 ms.

5. The process of claim 1, wherein setting up the counter further comprises:
    setting the number of the counter to a third number and setting a delay of the water control switch in the switching process to a fourth number in response to the water control switch being switched by one position;
    wherein in response to the water control switching from the high position to the low position, a second determination is made as to whether the water control switch carries out an operation of a downshift and then an upshift or an operation of a downshift only;
    wherein in response to the second determination that the operation of the downshift only is carried out, the period of time is equal to a first modifier multiplied by the third number less the fourth number, and the first modifier is the number of switched position and is a natural number greater than or equal to one;

wherein in response to the second determination that the operation of the downshift then the upshift is carried out, a third determination is made as to whether the number displayed on the counter is greater than the third number;

wherein in response to the third determination that the number displayed on the counter is smaller than the third number, the counter is reset;

wherein in response to the third determination that the number displayed on the counter is greater than the third number, the period of time is equal to a fifth number multiplied by the third number less the fourth number, and the fifth number is equal to a second modifier less one, and the second modifier is the number of switched positions and is a natural number greater than or equal to two.

6. The process of claim 1, wherein the counter is a time counter or a position counter.

\* \* \* \* \*